(12) United States Patent
Alon

(10) Patent No.: US 11,601,120 B2
(45) Date of Patent: Mar. 7, 2023

(54) ATTACK-RESISTANT RING OSCILLATORS AND RANDOM-NUMBER GENERATORS

(71) Applicant: Nuvoton Technology Corporation, Hsin-chu (TW)

(72) Inventor: Moshe Alon, Tel-Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 159 days.

(21) Appl. No.: 17/166,012

(22) Filed: Feb. 3, 2021

(65) Prior Publication Data

US 2022/0247395 A1    Aug. 4, 2022

(51) Int. Cl.
| | |
|---|---|
| *H03K 3/84* | (2006.01) |
| *G06F 7/58* | (2006.01) |
| *G06F 21/72* | (2013.01) |
| *H03K 3/03* | (2006.01) |

(52) U.S. Cl.
CPC .............. *H03K 3/84* (2013.01); *G06F 7/584* (2013.01); *G06F 7/588* (2013.01); *G06F 21/72* (2013.01); *H03K 3/0315* (2013.01); *G06F 2207/581* (2013.01)

(58) Field of Classification Search
CPC ........ H03K 3/0315; H03K 3/84; G06F 7/588; G06F 7/582; G06F 7/584
See application file for complete search history.

(56) References Cited

U.S. PATENT DOCUMENTS

| | | | |
|---|---|---|---|
| 4,161,041 A | 7/1979 | Butler et al. | |
| 4,905,176 A | 2/1990 | Schulz | |
| 5,251,165 A | 10/1993 | James, III | |
| 6,763,363 B1 | 7/2004 | Driscoll | |
| 6,792,438 B1 | 9/2004 | Wells et al. | |
| 7,117,233 B2 | 10/2006 | Dichtl | |
| 7,161,970 B2 | 1/2007 | Lim et al. | |
| 7,269,614 B2 | 9/2007 | Wells et al. | |
| 8,024,386 B2 | 9/2011 | Song et al. | |
| 8,489,660 B2 | 7/2013 | Herbert et al. | |

(Continued)

FOREIGN PATENT DOCUMENTS

| | | |
|---|---|---|
| CN | 110795063 A | 2/2020 |
| DE | 19921852 A1 | 11/2000 |

(Continued)

OTHER PUBLICATIONS

Cater, "Designing Gain and Offset in Thirty Seconds," Application Report SLOA097, Texas Instruments, pp. 1-15, Feb. 2002.

(Continued)

*Primary Examiner* — Ryan Johnson
(74) *Attorney, Agent, or Firm* — Kligler & Associates Patent Attorneys Ltd

(57) ABSTRACT

An oscillator circuit includes a plurality of inverters connected in a cascade, at least first and second feedback taps, and alternation circuitry. The at least first and second feedback taps are configured to feed-back at least respective first and second output signals taken from at least respective first and second points in the cascade. The alternation circuitry is configured to derive an input signal from at least the first and second output signals by alternating between at least the first and second feedback taps, and to apply the input signal to an input of the cascade.

13 Claims, 2 Drawing Sheets

(56) References Cited

U.S. PATENT DOCUMENTS

| | | | |
|---|---|---|---|
| 8,583,713 | B2 | 11/2013 | Sugimoto et al. |
| 9,189,202 | B2 | 11/2015 | Burleson et al. |
| 9,531,354 | B1 | 12/2016 | Sim |
| 9,696,965 | B2 | 7/2017 | Alon |
| 10,824,396 | B2 | 11/2020 | Hershman |
| 10,878,133 | B2 | 12/2020 | Hershman |
| 2005/0097153 | A1 | 5/2005 | Dirscherl et al. |
| 2008/0091755 | A1 | 4/2008 | Mudge et al. |
| 2009/0106339 | A1 | 4/2009 | Vasyltsov et al. |
| 2009/0248771 | A1* | 10/2009 | Vergnes ............... H04L 9/0861 708/251 |
| 2012/0221616 | A1 | 8/2012 | Yasuda et al. |
| 2013/0013657 | A1 | 1/2013 | Emelko et al. |
| 2013/0093502 | A1 | 4/2013 | Kim et al. |
| 2014/0344321 | A1 | 11/2014 | Hamilton et al. |
| 2015/0149790 | A1 | 5/2015 | Li |
| 2015/0372685 | A1* | 12/2015 | Kitagawa ............ G11C 7/1066 331/57 |
| 2018/0143806 | A1 | 5/2018 | Park et al. |
| 2020/0042289 | A1 | 2/2020 | Wang et al. |
| 2021/0409008 | A1* | 12/2021 | Wu ....................... H03K 3/0315 |

FOREIGN PATENT DOCUMENTS

| | | | |
|---|---|---|---|
| JP | | 2567681 B2 | 12/1996 |
| JP | | 2010117846 A * | 5/2010 |

OTHER PUBLICATIONS

Ben Romdhane, "Modeling, Design and Characterization of Delay-Chains Based True Random Number Generator," Doctoral Thesis, Micro and Nanotechnologies/Microelectronics,Télécom ParisTech, pp. 1-181, year 2014.

Ranasinghe et al., "Random Numbers from Metastability and Thermal Noise," Electronics Letters, vol. 41, issue 16, pp. 891-893, Aug. 4, 2005.

Dichtl et al., "High-Speed True Number Generation with Logic Gates Only," Proceedings of the International Workshop on Cryptographic Hardware and Embedded Systems, pp. 45-62, year 2007.

Hata et al., "FPGA Implementation of Metastability-Based True Random Number Generator," IEICE Transactions on Information and Systems, vol. E95-D, issue 2, pp. 426-436, Feb. 2012.

Torii et al,, "ASIC implementation of random number generators using SR latches and its evaluation," EURASIP Journal on Information Security, pp. 1-12, year 2016.

Ben-Romdhane et al., "Stochastic Model of a Metastability-Based True Random Number Generator," International Conference on Trust and Trustworthy Computing, pp. 92-105, year 2013.

Majzoobi et al., "FPGA-based True Random Number Generation using Circuit Metastability with Adaptive Feedback Control," International Workshop on Cryptographic Hardware and Embedded Systems—CHES 2011, pp. 17-32, year 2011.

Hars., "Random Number Generation Based on Oscillatory Metastability in Ring Circuits", Cryptology ePrint Archive, issue 2011/637, pp. 1-15, Nov. 26, 2011.

Kim et al., "Nano-Intrinsic True Random Number Generation," arXiv:1701.06020v1 [cs.ET], pp. 1-9, Jan. 21, 2017.

Barangi et al., "Straintronics-Based True Random Number Generator for High-Speed and Energy-Limited Applications," IEEE Transactions on Magnetics, vol. 52, No. 1, pp. 1-9, Jan. 2016.

Kinniment et al., "Design of an On-Chip Random Number Generator using Metastability," Proceedings of the 28th European Solid-State Circuits Conference, pp. 1-4, Sep. 24-26, 2002.

Srinivasan et al., "2.4 GHz 7mW All-Digital PVT-Variation Tolerant True Random Number Generator in 45nm CMOS," Symposium on VLSI Circuits/Technical Digest of Technical Papers, pp. 203-204, Jul. 2010.

Mathew et al., "2.4 Gbps, 7 mW All-Digital PVT-Variation Tolerant True Random Number Generator for 45 nm CMOS High-Performance Microprocessors," IEEE Journal of Solid-State Circuits, vol. 47, issue 11, pp. 2807-2821, Nov. 2012.

Hamburg er al., "Analysis of Intel's Ivy Bridge Random Number Generator," Cryptography Research, Inc., pp. 1-22, Mar. 2012.

Tokunaga et al., "True Random Number Generator With a Metastability-Based Quality Control," IEEE Journal of Solid-State Circuits, vol. 43, No. 1, pp. 78-85, Jan. 2008.

Kirschner et al., U.S. Appl. No. 16/995,951, filed Aug. 18, 2020.

* cited by examiner

ATTACK-RESISTANT RING OSCILLATORS AND RANDOM-NUMBER GENERATORS

FIELD OF THE INVENTION

The present invention relates generally to data security, and particularly to attack-resilient ring oscillators (ROs) and random-number generators (RNGs).

BACKGROUND OF THE INVENTION

Various techniques for random-number generation are known in the art. For example, U.S. Pat. No. 4,905,176 describes a random number generator that is invulnerable to cryptographic attack. The principle of operation of the random number generator is based upon low-frequency sampling of the output of a pseudo-random number generator which is operated at a varying frequency from a free-running ring oscillator.

SUMMARY OF THE INVENTION

An embodiment of the present invention that is described herein provides an oscillator circuit including a plurality of inverters connected in a cascade, at least first and second feedback taps, and alternation circuitry. The at least first and second feedback taps are configured to feed-back at least respective first and second output signals taken from at least respective first and second points in the cascade. The alternation circuitry is configured to derive an input signal from at least the first and second output signals by alternating between at least the first and second feedback taps, and to apply the input signal to an input of the cascade.

In some embodiments, the first point is an intermediate point in the cascade, and the second point is an end of the cascade. In disclosed embodiments, the alternation circuitry is configured to alternate between at least the first and second feedback taps in a pseudo-random switching pattern.

In some embodiments, the alternation circuitry includes (i) a multiplexer configured to multiplex at least the first and second feedback taps to the input of the cascade, and (ii) a sequence generator configured to generate a bit sequence and to control the multiplexer by the bit sequence. In an example embodiment, the sequence generator includes a Linear Feedback Shift Register (LFSR).

In an embodiment, (i) a number of the inverters from the input of the cascade back to the input of the cascade via the first feedback tap, and (ii) a number of the inverters from the input of the cascade back to the input of the cascade via the second feedback tap, are both odd numbers. In an embodiment, (i) a number of the inverters from the input of the cascade back to the input of the cascade via the first feedback tap, and (ii) a number of the inverters from the input of the cascade back to the input of the cascade via the second feedback tap, are mutually-prime numbers.

There is additionally provided, in accordance with an embodiment of the present invention, a Random-Number Generator (RNG) circuit including a first oscillator, a second oscillator and a sampling circuit. The first oscillator is configured to generate a first signal in a first frequency range. The second oscillator is configured to generate a second signal in a second frequency range, lower than the first frequency range. The sampling circuit is configured to output pseudo-random data by sampling the first signal using the second signal. At least one of the first and second oscillators includes a plurality of inverters connected in a cascade, at least first and second feedback taps, and alternation circuitry. The at least first and second feedback taps are configured to feed-back at least respective first and second output signals taken from at least respective first and second points in the cascade. The alternation circuitry is configured to derive an input signal from at least the first and second output signals by alternating between at least the first and second feedback taps, and to apply the input signal to an input of the cascade.

There is further provided, in accordance with an embodiment of the present invention, a method including operating a circuit including (i) a plurality of inverters connected in a cascade, and (ii) at least first and second feedback taps, configured to feed-back at least respective first and second output signals taken from at least respective first and second points in the cascade. An input signal is derived from at least the first and second output signals by alternating between at least the first and second feedback taps. The input signal is applied to an input of the cascade.

The present invention will be more fully understood from the following detailed description of the embodiments thereof, taken together with the drawings in which:

DETAILED DESCRIPTION OF EMBODIMENTS

Overview

Figure 1:
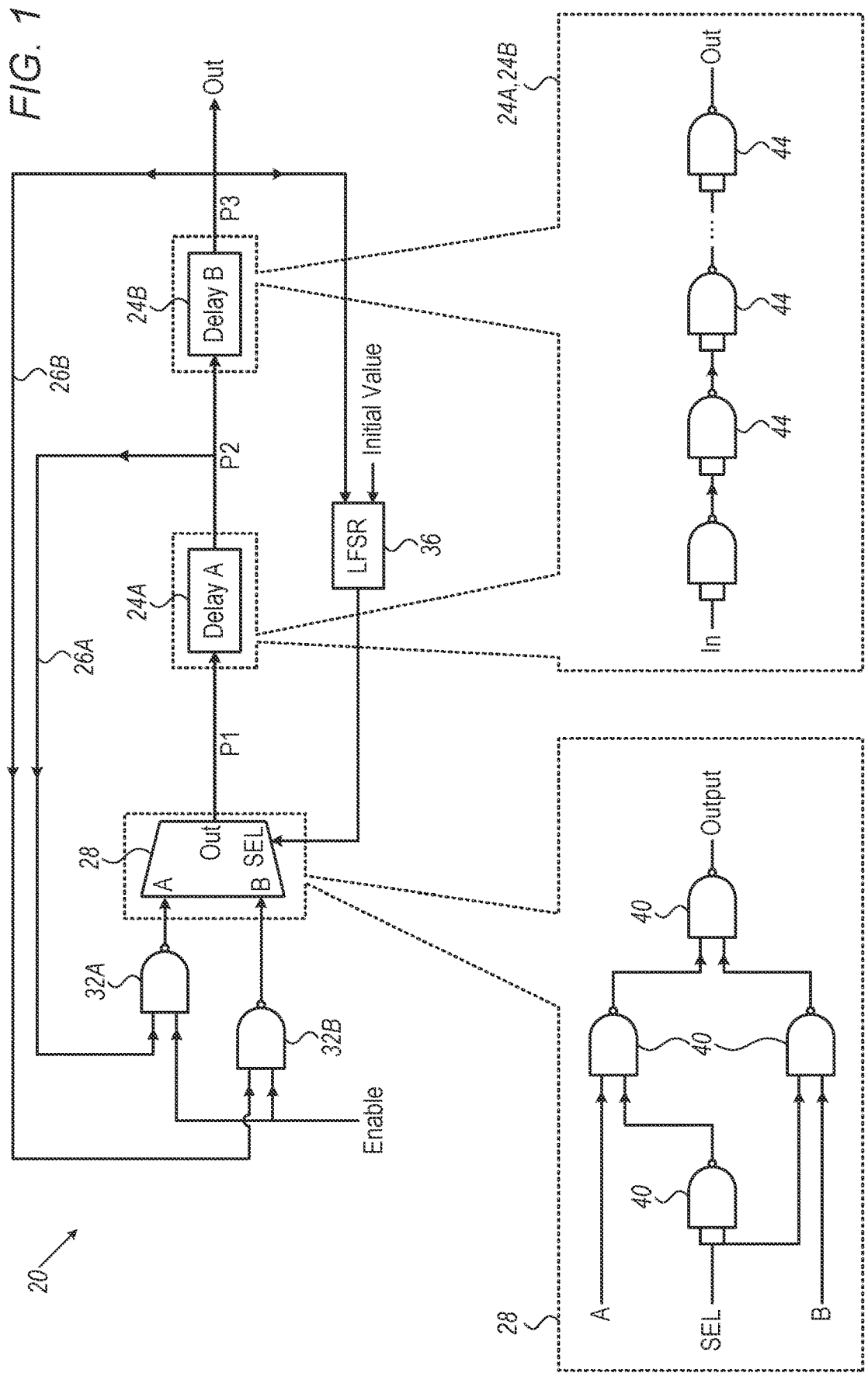
FIG. 1 is a block diagram that schematically illustrates an attack-resistant Ring Oscillator (RO), in accordance with an embodiment of the present invention.

Embodiments of the present invention that are described herein provide improved Ring Oscillators (ROs) and Random-Number Generators (RNGs), and associated methods. The disclosed ROs and RNGs are resilient against various types of security threats, such as fault-injection and other side-channel attacks. As such, the disclosed techniques are useful, for example, in various cryptographic applications that involve random-number generation.

In some embodiments, a RO comprises multiple inverters connected in a cascade. Two feedback taps are connected to feed-back two output signals taken from two different points in the cascade (e.g., one from the end of the cascade, and the other from an intermediate point). A multiplexer (MUX) is configured to select between the two feedback taps, and to connect the selected feedback tap to the input of the cascade.

When one of the feedback taps is selected by the MUX, the RO has a certain loop delay. When the other feedback tap is selected, the RO circuit has a different loop delay. Toggling the MUX causes the loop delay of the ring oscillator, and thus its oscillation frequency, to alternate between two values associated with the two feedback taps.

In some embodiments, the RO comprises a sequence generator that generates a bit sequence, and the bit sequence is used as a selection signal that toggles the MUX. The sequence generator may comprise, for example, a Linear Feedback Shift Register (LFSR) that generates a pseudo-random bit sequence. The RO output may be taken from any suitable point in the cascade.

When operating as described above, the RO alternates between two loop delays, and thus between two oscillation frequencies, in a rapid and unpredictable manner. This sort of alternation makes the RO highly resilient to attacks.

The embodiments described below refer mainly to a configuration having two feedback taps, by way of example. Generally, however, the RO may comprise a larger number of feedback taps that are multiplexed so as to alternate among more than two loop delays and respective oscillation frequencies.

In some embodiments of the present invention, the disclosed alternating-frequency RO design is used as a building block of a Random-Number Generator (RNG). In example embodiments, a RNG comprises a high-frequency oscillator configured to generate a high-frequency signal, and a low-frequency oscillator configured to generate a low-frequency signal. The two oscillators run asynchronously relative to one another. The RNG further comprises a sampling circuit configured to sample the high-frequency signal using the low-frequency signal. The output of the sampling circuit, i.e., the high-frequency signal sampled by the low-frequency signal, is used as the output of the RNG.

In some embodiments, one or both of the oscillators in the RNG may be implemented using the disclosed design having alternating oscillation frequency. Such an RNG is highly resilient against attacks. For example, a well-known type of attack on RO-based RNGs applies a side-channel signal (e.g., an electromagnetic signal) that is synchronized to the RO oscillation frequency. The disclosed techniques render such an attack infeasible.

Attack-Resistant Ring Oscillator Design

FIG. 1 is a block diagram that schematically illustrates an attack-resistant Ring Oscillator (RO) 20, in accordance with an embodiment of the present invention. RO 20 can be used in various systems and applications. In particular, the use of such ROs in the design of attack-resistant Random-Number Generators (RNGs) is addressed further below. ROs and RNGs in accordance with an embodiment of the present invention can be used in any suitable system or application that involves the use of random numbers, such as in secure Integrated Circuits (ICs) that perform cryptographic operations.

RO 20 comprises a plurality of logic inverters connected in a cascade. In the present example the cascade is formed of two sections denoted 24A and 24B, each section comprising a subset of the inverters. The input of the cascade is denoted P1, the intermediate point at the end of section 24A is denoted P2, and the end of the cascade is denoted P3. In the present example P3 also serves as the RO output. Alternatively, the RO output may be taken from any other suitable point in the cascade.

RO 20 further comprises two feedback taps denoted 26A and 26B, which are connected to respective different points in the cascade of inverters. In the present example feedback tap 26A feeds-back an output signal from the intermediate point (P2), and feedback tap 26B feeds-back an output signal from the end of the cascade (P3).

In addition to the cascade of inverters and the feedback taps, RO 20 comprises "alternation circuitry" that is configured to derive an input signal from the output signals that are fed-back by feedback taps 26A and 26B, by alternating between the two feedback taps. The resulting input signal is provided to the input of the cascade, i.e., to point P1.

In the embodiment of FIG. 1, the alternation circuitry comprises a multiplexer (MUX) 28 and a Linear Feedback Shift Register (LFSR) 36. Feedback taps 26A and 26B are connected to respective inputs of MUX 28. The output of MUX 28 is connected to the input of the cascade (to P1). The output of LFSR 36 is used as a SELECT signal that controls MUX 28.

In the present example, two NAND gates 32A and 32B are also placed in the feedback path, for selectively enabling and disabling the operation of RO 20. In each of NAND gates 32A and 32B, one input is connected to a respective feedback tap, and the other input is connected to an ENABLE signal. The outputs of NAND gates 32A and 32B are connected to the respective inputs of MUX 28. In alternative embodiments NAND gates 32A and 32B can be omitted, in which case feedback taps 26A and 26B are connected directly to the inputs of MUX 28.

LFSR 36 may be initialized with any suitable initial value ("seed"). The LFSR is clocked by the clock signal generated by the cascade of inverters. As seen in the example of FIG. 1, LFSR 36 receives as input the output signal from P3, and uses this signal as a clock.

In some embodiments, in each clock cycle, LFSR 36 generates a new bit value pseudo-randomly. This bit value is used for choosing between the two inputs of MUX 28. For example, without loss of generality, in a clock cycle in which LFSR 36 generates a "0" value, MUX 28 connects input A (and thus feedback tap 26A) to the input of the cascade; and in a clock cycle in which LFSR 36 generates a "1" value, MUX 28 connects input B (and thus feedback tap 26B) to the input of the cascade. Alternatively, the opposite convention can be used.

In clock cycles in which feedback tap 26A is selected, RO 20 oscillates at an oscillation frequency that is determined by the total loop delay (e.g., from P1 back to P1) via feedback tap 26A. As seen in the figure, this loop delay is given by the sum of the delays of the following components:

Section 24A
NAND gate 32A
MUX 28

In clock cycles in which feedback tap 26B is selected, RO 20 oscillates at a different (lower) oscillation frequency that is determined by the total loop delay (e.g., from P1 back to P1) via feedback tap 26B. The loop delay in these clock cycles is given by the sum of the delays of the following components:

Section 24A
Section 24B
NAND gate 32B
MUX 28

In the example embodiment of FIG. 1, sections 24A and 24B of the cascade of inverters, as well as MUX 28, are implemented using NAND gates. This implementation is depicted in the two insets at the bottom of the figure. As seen, MUX 28 is implemented using four NAND gates 40, and each inverter in the cascade (in sections 24A and 24B) is implemented using a respective NAND gate 44 whose inputs are shorted together.

In this implementation, the total loop delay when feedback tap 26A is selected is given by $D1=(N1+3)\cdot D$, and the total loop delay when feedback tap 26B is selected is given by $D2=(N1+N2+3)\cdot D$, wherein D denotes the unit delay of a single NAND gate, N1 denotes the number of inverters in section 24A, and N2 denotes the number of inverters in section 24B. The 3D term in both loop delays accounts for the delays of MUX 28 (equal to $2\cdot D$) and the delay of NAND gate 32A or 32B (equal to $1\cdot D$).

Typically, the total number of inverters traversed when feedback tap 26A is selected (D1/D), and the total number of inverters traversed when feedback tap 26B is selected (D2/D), are both odd numbers. In some embodiments, although not necessarily, N1 and N2 are chosen so that the total numbers of inverters D1/D and D2/D are mutually prime numbers. In one example, N1=20 and N2=6, yielding D1=23 and D2=29.

In one non-limiting example, D=50 pSec, 23·D=1.15 nS (corresponding to an oscillation frequency of ~896 MHz), and 29·D=1.45 nS (corresponding to an oscillation frequency of ~689 MHz). In alternative embodiments, however, any other suitable values can be used.

The configuration of RO 20 shown in FIG. 1 is an example configuration that is depicted purely for the sake of conceptual clarity. In alternative embodiments, any other suitable configuration can be used. For example, instead of LFSR 36, MUX 28 may be controlled by any other suitable sequence generator. The bit sequence controlling MUX 28 need not necessarily be pseudo-random.

Moreover, in alternative embodiments RO 20 may comprise M feedback taps, M>2. In such embodiments, MUX 28 comprises M inputs. A sequence generator (e.g., LFSR) may be used to generate multi-bit values for alternating among the M inputs, thereby causing the RNG to alternate among M different oscillation frequencies.

Figure 2:
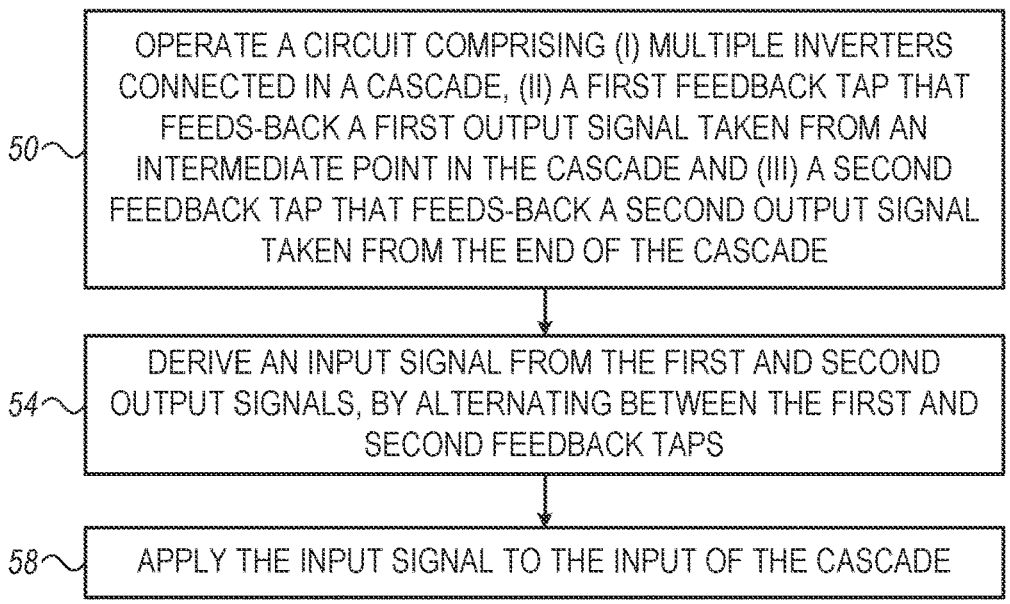
FIG. 2 is a flow chart that schematically illustrates a method for operating the RO of FIG. 1, in accordance with an embodiment of the present invention.

FIG. 2 is a flow chart that schematically illustrates a method for operating RO 20, in accordance with an embodiment of the present invention. The method begins by operating the cascade of inverters and feedback taps 26A and 26B, at an operation step 50. At an alternation step 54, the alternation circuitry (e.g., LFSR 36 and MUX 28) alternate between the two output signals provided by feedback taps 26A and 26B. At an input driving step 58, the output of MUX 28 is applied to the input of the cascade of inverters.

Figure 3:
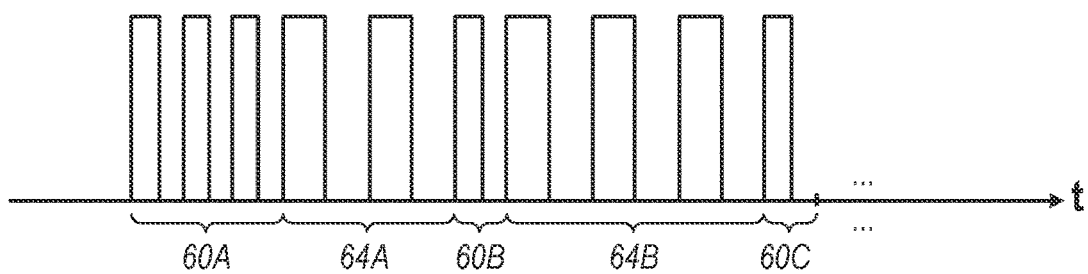
FIG. 3 is a diagram illustrating an output signal generated by the RO of FIG. 1, in accordance with an embodiment of the present invention.

FIG. 3 is a diagram illustrating an example of an output signal generated by RO 20 of FIG. 1 as a function of time, in accordance with an embodiment of the present invention. The figure demonstrates the alternation between the two oscillation frequencies. As seen, the RO output signal alternates between two types of time intervals having two different oscillation frequencies:

- Time intervals 60A, 60B, 60C, . . . , during which MUX 28 connects input A (and thus feedback tap 26A) to the input of the cascade, and therefore RO 20 oscillates at an oscillation frequency that is determined by the loop delay via feedback tap 26A.
- Time intervals 64A, 64B, . . . , during which MUX 28 connects input B (and thus feedback tap 26B) to the input of the cascade, and therefore RO 20 oscillates at an oscillation frequency that is determined by the loop delay via feedback tap 26B.

The lengths of the time intervals 60A, 64A, 60B, 64B, . . . , are determined by the run-lengths of "0"s and "1"s in the output of LFSR 36, and are therefore pseudo-random.

Attack-Resistant Random-Number Generator Design

As noted above, in some embodiments the alternating-frequency design of RO 20 is used as a building block of a Random-Number Generator (RNG).

Figure 4:
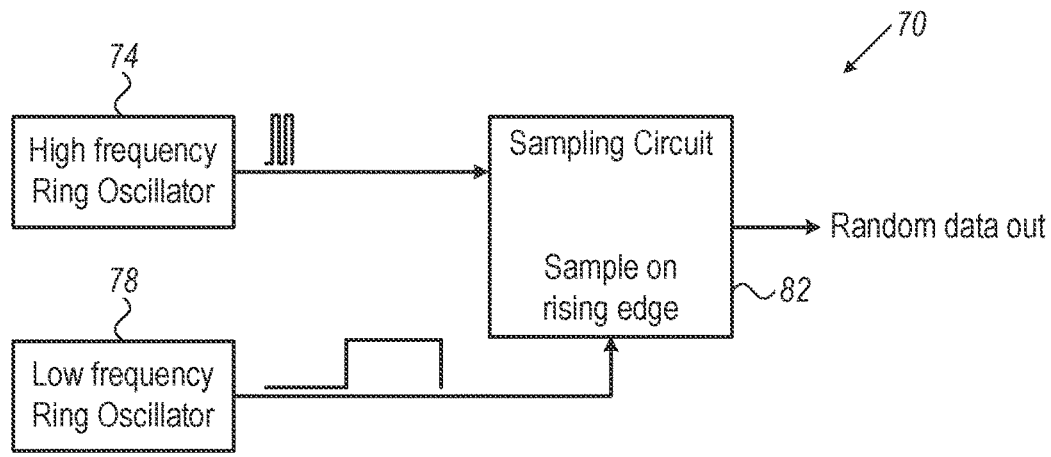
FIG. 4 is a block diagram that schematically illustrates an attack-resistant Random-Number Generator (RNG), in accordance with an embodiment of the present invention.

FIG. 4 is a block diagram that schematically illustrates an attack-resistant RNG 70, in accordance with an embodiment of the present invention. RNG 70 comprises a high-frequency RO 74 configured to generate a high-frequency signal, and a low-frequency RO 78 configured to generate a low-frequency signal. ROs 74 and 78 run asynchronously relative to one another. In some embodiments, one or both ROs are deliberately made noisy, e.g., using an analog noise source that amplifies thermal noise or noise originating from any other suitable noise source.

The high-frequency signal and the low-frequency signal may have any suitable frequencies, as long as the frequency of the low-frequency signal is considerably lower than the frequency of the high-frequency signal. In some embodiments, although not necessarily, the frequency of the high-frequency signal is on the order of MHz, and the frequency of the low-frequency signal is on the order of KHz.

RNG 70 further comprises a sampling circuit 82, which is configured to sample the high-frequency signal using the low-frequency signal. The output of sampling circuit 82 is provided as a "RANDOM DATA OUT" output of the RNG. In an example embodiment, sampling circuit 82 samples the high-frequency signal on the rising edges of the low-frequency signal. Alternatively, sampling on the falling edges, or on both rising and falling edges, can be used.

Further aspects of RNGs based on high-frequency and low-frequency oscillators are addressed in U.S. Pat. No. 4,905,176, cited above, and in U.S. patent application Ser. No. 16/995,951, entitled "Distributed Random-Number Generator," filed Aug. 18, 2020, whose disclosure is incorporated herein by reference.

In some embodiments, high-frequency RO 74, low-frequency RO 78, or both, may be implemented using the configuration of FIG. 1 above. As such, any or both of ROs 74 and 78 may have an alternating oscillation frequency, making RNG 70 resistant to attacks. The frequencies of the two oscillators are chosen such that, at any time and irrespective of the frequency alternations, the frequency of the low-frequency signal is lower than the frequency of the high-frequency signal.

The configuration of RNG 70 shown in FIG. 4 is an example configuration that is depicted purely for the sake of conceptual clarity. In alternative embodiments, any other suitable configuration can be used. For example, when only one of oscillators 74 and 78 is implemented using the configuration of RO 20, the other oscillator need not necessarily be a ring oscillator.

In various embodiments, the disclosed RO and RNG circuits may be implemented using any suitable hardware or firmware, such as using one or more discrete components, one or more Application-Specific Integrated Circuits (ASICs) and/or one or more Field-Programmable Gate Arrays (FPGAs).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An oscillator circuit, comprising:
a plurality of inverters connected in a cascade;
at least first and second feedback taps, configured to feed-back at least respective first and second output signals taken from at least respective first and second points in the cascade;
a multiplexer, configured to multiplex at least the first and second feedback taps to the input of the cascade; and
a sequence generator, configured to generate a bit sequence, and to control the multiplexer by the bit sequence,
wherein the inverters, the first feedback tap, the second feedback tap and the multiplexer are implemented using logic gates having a uniform unit gate delay, and
wherein (i) a first count of the logic gates, from the input of the cascade back to the input of the cascade via the first feedback tap, including a first group of the inverters, the first feedback tap and the multiplexer, and (ii) a second count of the logic gates, from the input of the cascade back to the input of the cascade via the second feedback tap, including a second group of the inverters, the second feedback tap and the multiplexer, are mutually-prime numbers.

2. The oscillator circuit according to claim 1, wherein the first point is an intermediate point in the cascade, and wherein the second point is an end of the cascade.

3. The oscillator circuit according to claim 1, wherein the sequence generator is configured to control the multiplexer to alternate between at least the first and second feedback taps in a pseudo-random switching pattern.

4. The oscillator circuit according to claim 1, wherein the sequence generator comprises a Linear Feedback Shift Register (LFSR).

5. The oscillator circuit according to claim 1, wherein (i) a number of the inverters from the input of the cascade back to the input of the cascade via the first feedback tap, and (ii) a number of the inverters from the input of the cascade back to the input of the cascade via the second feedback tap, are both odd numbers.

6. A Random-Number Generator (RNG) circuit, comprising:
a first oscillator, configured to generate a first signal in a first frequency range;
a second oscillator, configured to generate a second signal in a second frequency range, lower than the first frequency range; and
a sampling circuit, configured to output pseudo-random data by sampling the first signal using the second signal, wherein at least one of the first and second oscillators comprises:
a plurality of inverters connected in a cascade;
at least first and second feedback taps, configured to feed-back at least respective first and second output signals taken from at least respective first and second points in the cascade;
a multiplexer, configured to multiplex at least the first and second feedback taps to the input of the cascade; and
a sequence generator, configured to generate a bit sequence, and to control the multiplexer by the bit sequence,
wherein the inverters, the first feedback tap, the second feedback tap and the multiplexer are implemented using logic gates having a uniform unit gate delay, and
wherein (i) a first count of the logic gates, from the input of the cascade back to the input of the cascade via the first feedback tap, including a first group of the inverters, the first feedback tap and the multiplexer, and (ii) a second count of the logic gates, from the input of the cascade back to the input of the cascade via the second feedback tap, including a second group of the inverters, the second feedback tap and the multiplexer, are mutually-prime numbers.

7. The RNG circuit according to claim 6, wherein the sequence generator is configured to control the multiplexer to alternate between at least the first and second feedback taps in a pseudo-random switching pattern.

8. The RNG circuit according to claim 6, wherein the sequence generator comprises a Linear Feedback Shift Register (LFSR).

9. A method, comprising:
operating a circuit comprising (i) a plurality of inverters connected in a cascade, and (ii) at least first and second feedback taps, configured to feed-back at least respective first and second output signals taken from at least respective first and second points in the cascade;
generating a bit sequence using a sequence generator; and
controlling a multiplexer using the bit sequence to multiplex at least the first and second feedback taps to the input of the cascade,
wherein the inverters, the first feedback tap, the second feedback tap and the multiplexer are implemented using logic gates having a uniform unit gate delay, and
wherein (i) a first count of the logic gates, from the input of the cascade back to the input of the cascade via the first feedback tap, including a first group of the inverters, the first feedback tap and the multiplexer, and (ii) a second count of the logic gates, from the input of the cascade back to the input of the cascade via the second feedback tap, including a second group of the inverters, the second feedback tap and the multiplexer, are mutually-prime numbers.

10. The method according to claim 9, wherein the first point is an intermediate point in the cascade, and wherein the second point is an end of the cascade.

11. The method according to claim 9, wherein controlling the multiplexer comprises causing the multiplexer to alternate between at least the first and second feedback taps in a pseudo-random switching pattern.

12. The method according to claim 9, wherein generating the bit sequence comprises generating the bit sequence by a Linear Feedback Shift Register (LFSR).

13. The method according to claim 9, wherein (i) a number of the inverters from the input of the cascade back to the input of the cascade via the first feedback tap, and (ii) a number of the inverters from the input of the cascade back to the input of the cascade via the second feedback tap, are both odd numbers.

* * * * *